United States Patent [19]

Hung

[11] Patent Number: 4,738,542

[45] Date of Patent: Apr. 19, 1988

[54] AUTOMATIC EGG-BEATER

[76] Inventor: Bu S. Hung, 5FL-3, No.69, Sec.3 San-Ming Road, Taichung, Taiwan

[21] Appl. No.: 901,948

[22] Filed: Aug. 29, 1986

[51] Int. Cl.⁴ .................................... B01F 7/26
[52] U.S. Cl. .................... 366/244; 366/286; 366/343
[58] Field of Search ............... 366/129, 279, 242, 244, 366/245, 247, 249, 251, 255, 258, 261, 285, 286, 289, 347, 605, 343

[56] References Cited

U.S. PATENT DOCUMENTS

| | | | |
|---|---|---|---|
| 1,412,401 | 4/1922 | Gotfredsen | 366/347 |
| 2,932,494 | 4/1960 | Wales | 366/129 |
| 3,411,756 | 11/1968 | Ziegler | 366/251 |
| 4,439,043 | 3/1984 | Daloz | 366/251 |

Primary Examiner—Robert W. Jenkins
Attorney, Agent, or Firm—Asian Pacific International Patent and Trademark Office

[57] ABSTRACT

It is an egg-beater (or egg-whisk), particularly, an automatic egg-beater, which comprises a cylindrical handle on the upper half portion; the top of the cylindrical handle is mounted with a 16-side (or 16-polygonal) cap; the feature of the rotary cap not only can prevent from being slippery upon rotating it by hand, but also can prevent from rolling away upon placing it on a flat surface. The cap is connected to an inner cylinder which is sleeved inside the cylindrical handle. A motor being fixed on a base is mounted in the inner cylinder. The center rod of the agitator and the lower end of the motor spindle are connected together by means of a fan blade assembly. The bottom of the cylindrical handle is substantially a round base with several concentric round grooves for fitting containers or cups with different diameters. Upon pressing the top switch on the handle, the motor will drive the agitator to rotate at a high speed to agitate the egg liquid in the container. The height of the agitator may be adjusted so as to fit the size of the container and to fit the amount of egg liquid in the container for fully utilizing the agitating power.

5 Claims, 4 Drawing Sheets

AUTOMATIC EGG-BEATER

BACKGROUND OF THE INVENTION

Most of the conventional egg-beaters or egg-whisks are made of a plurality of wires, being operated in a container that has a large opening (such as a soup pot or a large bowl). A user usually has to hold the agitator with one hand to beat the eggs until the egg liquid is likely to become homogeneous; however, it takes time and manpower to operate the conventional egg-beater without obtaining a thoroughly homogeneous egg liquid. There are also the electrical egg-beaters, comprising two agitators, each of which includes two sets of "c" shaped frames being mounted oppositely around a center rod. However, those electrical egg-beaters also have the following drawbacks:
(1) Too noisy.
(2) To be held with hand.
(3) Used with a container with a large opening.
(4) Inconvenient to clean it.
(5) Too heavy to handle.
(6) Unable to agitate a small amount of egg liquid.
(7) Having a large dimensions and taking a lot of room to set up; moreover, it is still unable to provide a fully automatic agitation.

SUMMARY OF THE INVENTION

In view of the drawbacks of the conventional egg-beaters, the inventor has developed the present invention, "An automatic egg-beater". The prime feature is that a cylindrical handle is mounted on the upper half portion of the beating machine. The top of the machine is covered with a rotary 16-polygonal cap which can to be turned manually without slipping and which will not roll on a flat surface. The lower portion of the rotary cap is furnished with a flange so as to be engaged with a channel on the inner wall of the cylindrical handle and to have the inner cylinder and the cylindrical handle fastened together (the cap and the inner cylinder are substantially integrated). A motor mounted on a motor base is mounted inside the inner cylinder. The center rod of the agitator and the lower end of the motor spindle are connected together by means of a fan blade assembly. The bottom side of the cylindrical handle has several concentric round grooves for holding a number of containers or cups having corresponding diameters. Upon pressing the top switch with a finger, the convex-shaped disc mounted under the lower end of the agitator will be driven to rotate at a high speed by the motor so as to beat the egg liquid in the container. The position of the agitator can be adjusted so as to adapt to the containers with different sizes, and to adapt to the different depths of the egg liquid to obtain better homogeneous egg liquid.

Another feature of the present invention is that, under the base of the cylindrical handle, several concentric round grooves are provided so as to hold the containers of different sizes, and to prevent the egg liquid from overflow during the agitation. One side of the cylindrical handle base has a cut portion to be fitted with the outlet of a container. After the beating process, the machine and the container can be cleaned and assembled together again so as to prevent the agitator from being polluted, and to save storage space as well.

Still another feature of the present invention is that the rotary cap is mounted with a wire socket for connecting the power line, i.e., the socket and the power line can be separated from each other after the agitation so as to facilitate the agitator being directly put under a water faucet to wash for time-saving and convenience purposes.

A further feature of the present invention is that the top of the rotary cap is mounted with a retainer and a pressing cap. In case of requiring longer time of agitation, set the pressing cap, by turning the retainer, on the switch so as to press the switch in a normal "ON" condition and to have the agitator run continuously without holding the cap and with a hand or the switch with a thumb. To stop the agitation, turn the pressing cap of the retainter away from the switch, and the switch will be turned off to stop the motor.

A still further feature of the present invention is that the motor base is furnished with two studs to be engaged in the double coil groove and in the two vertical slots on the inner cylinder. Upon rotating the inner cylinder, the motor base will move up and down along the coil groove. Simultaneously, the agitator will also move up and down. This feature can render the machine to fit the containers with different sizes and to agitate the egg liquid at different depths. Therefore, it is deemed a new agitator.

Yet another feature of the present invention is that a fan blade assembly made of plastic material is mounted between the agitator and the motor spindle, and all three members rotate synchronously. During agitation, the motor beat can be dissipated simultaneously so as to increase the serviceable life of the motor.

Yet a further feature of the present invention is that the bottom portion of the agitator is mounted with a convex-shaped disc being furnished with a plurality of the upper and lower ribs, and with a number of vertical agitating studs. When the agitator is driven by the motor, the ribs and the agitating studs will be rotated at a high speed to generate a whirlpool in the agitated egg without making noise.

DETAILED DESCRIPTION

Figure 1:
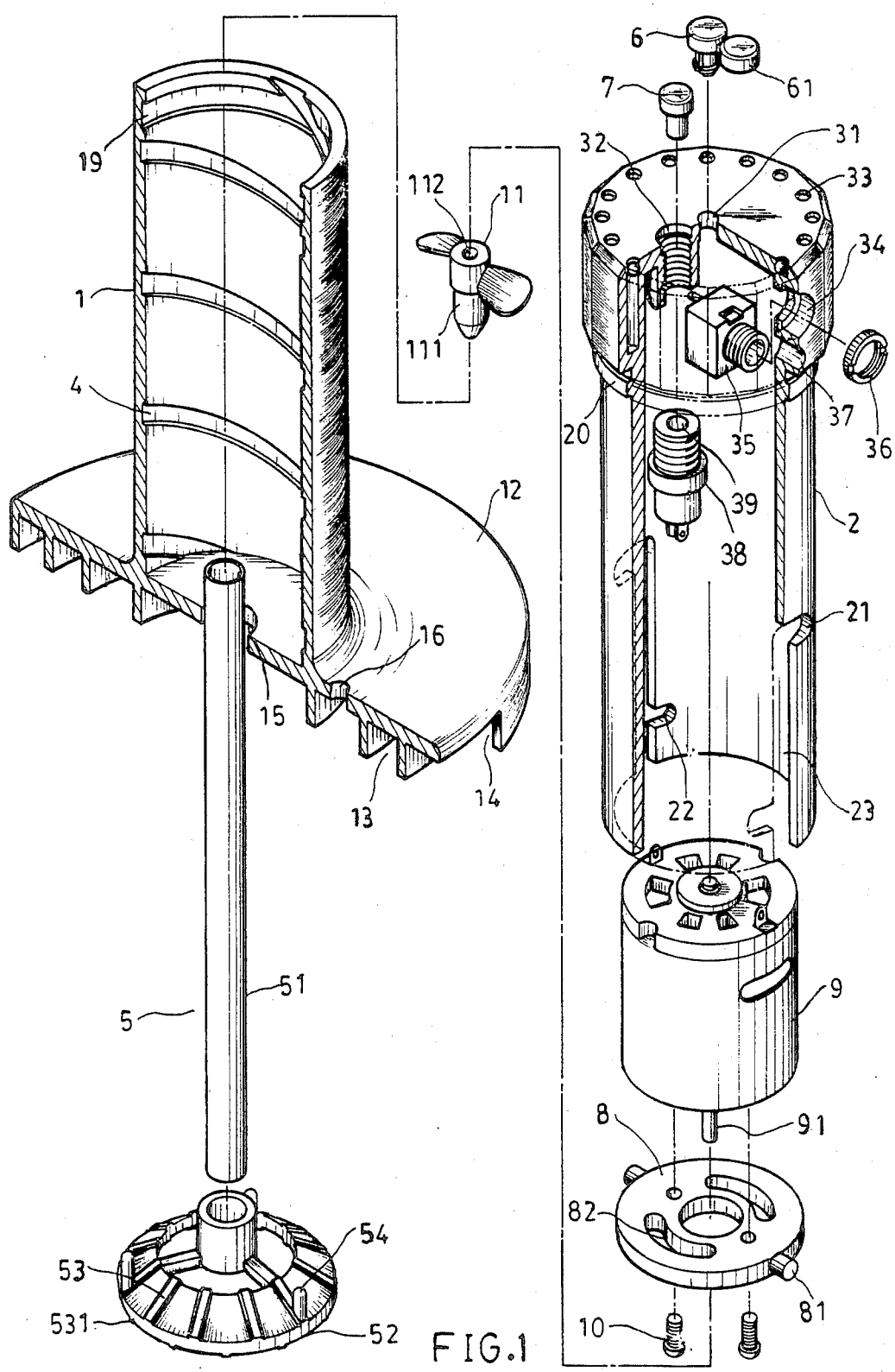
FIG. 1 is a disassembled view of the present invention.

Referring to FIG. 1, it shows a disassembled view of the present invention, of which the upper portion is mounted with a cylindrical handle 1 with a coil groove 4 furnished on the inner wall and with a round base 12 on the bottom portion. Underneath the base 12 surface, several concentric round grooves 13 are furnished so as to fit several containers with different opening diameters. On one side of the base 12, there is a cut portion 14 which can coincide with the outlet of a container to be used together with the machine. The center of the base 12 has a round hole 15 for receiving the center rod 51 of the agitator 5. The base 12 is also furnished with a small hole 16 for ventilation and adding flavorings. The inner cylinder 2 is sleeved in the cylindrical handle 1. The top of the inner cylinder 2 is furnished with a rotary cap 3, of which the center is provided with two round holes 31 and 32 for mounting a retainter 6 in hole 31 and a switch 7 in hole 32 respectively.

The retainer 6 is rotatable, and has a pressing cap 61 that is mounted on the switch 7. The top edge portion of the rotary cap 3 is furnished with a plurality of small holes 33, wherein a number of pearls can be embedded for decorating purpose. The circumference of the rotary cap 3 is provided with polygonal surfaces, which can facilitate the user to rotate, and can prevent the rotary cap from rolling away upon being placed on a flat surface, and also can render a beautiful outer shape. The side wall of the rotary cap 3 is furnished with a socket hole 34 for mounting a socket 35; a part of the socket 35 extends out of the socket hole so as to be fixed in place with a collar 36, and to let a plug to be plugged in the socket. The side wall of the rotary cap 3 is furnished with four ventilating holes 37 (only one is shown) to dissipate heat. The lower portion of the cap 3 is furnished with a flange 20, which is used to connect to the inner cylinder 2, and to embed into the channel 19 on the inner wall of the cylindrical handle 1 in a rotating manner. The wall of the inner cylinder 2 is furnished with two sets of symmetrical notches 21 and 22 for receiving two studs 81 on the motor base 8 so as to limit the displacement of motor base 8. The inner cylinder 2 is furnished with two vertical slots 23 on the opposite side thereof so as to let the two studs 81 slide up and down. The motor 9 is mounted on the motor base 8 with screws 10. One end of the motor spindle 91 is mounted in the spindle hole 112 of the fan blade assembly 11. The motor base 8 has two studs 81 on the circumference thereof, and has two ventilating slots 82 arranged symmetrically for facilitating the fan blade assembly 11 to dissipate heat. The upper end of the center rod 51 of the agitator 5 is closely sleeved on the round stub 11 of the fan blades assembly 11. The lower end of the center rod 51 is connected with a convex-shaped disc 52, which comprises a plurality of the upper ribs 53 and the lower ribs 531, and three vertical agitating studs 54.

Figure 2:
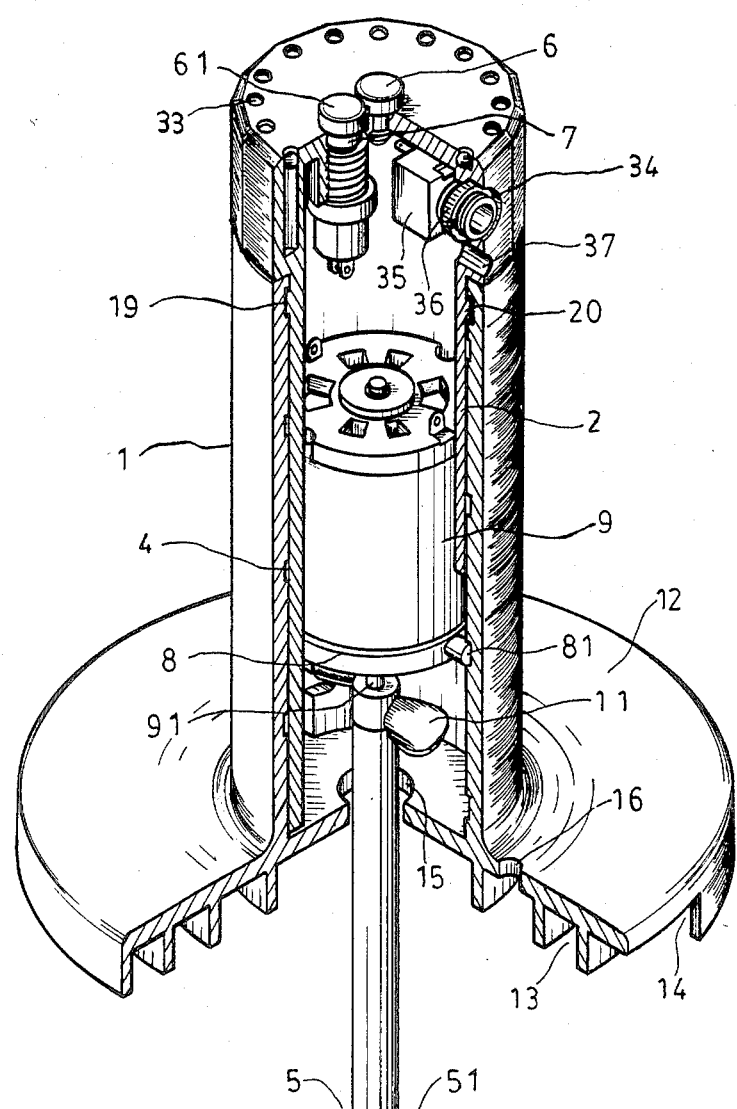
FIG. 2 is a sectional view of the present invention.

FIG. 2 illustrates a sectional view of the present invention, in which the motor 9 is fixedly mounted on the motor base 8, and both of them are installed in the inner cylinder 2; the agitator 5 is connected to the round stub 111 of the fan blades assembly 11. Upon setting the pressing cap 61 of the retainer 6 by hand, on the top of the switch 7, the switch will be in the normal "ON" condition to cause the motor 9 to drive the convex-shaped disc 52 of the agitator 5 to rotate at a high speed. By means of the ribs 53 and 531 and the agitating studs 54, the egg liquid will be agitated in a homogeneous condition.

Figure 3:
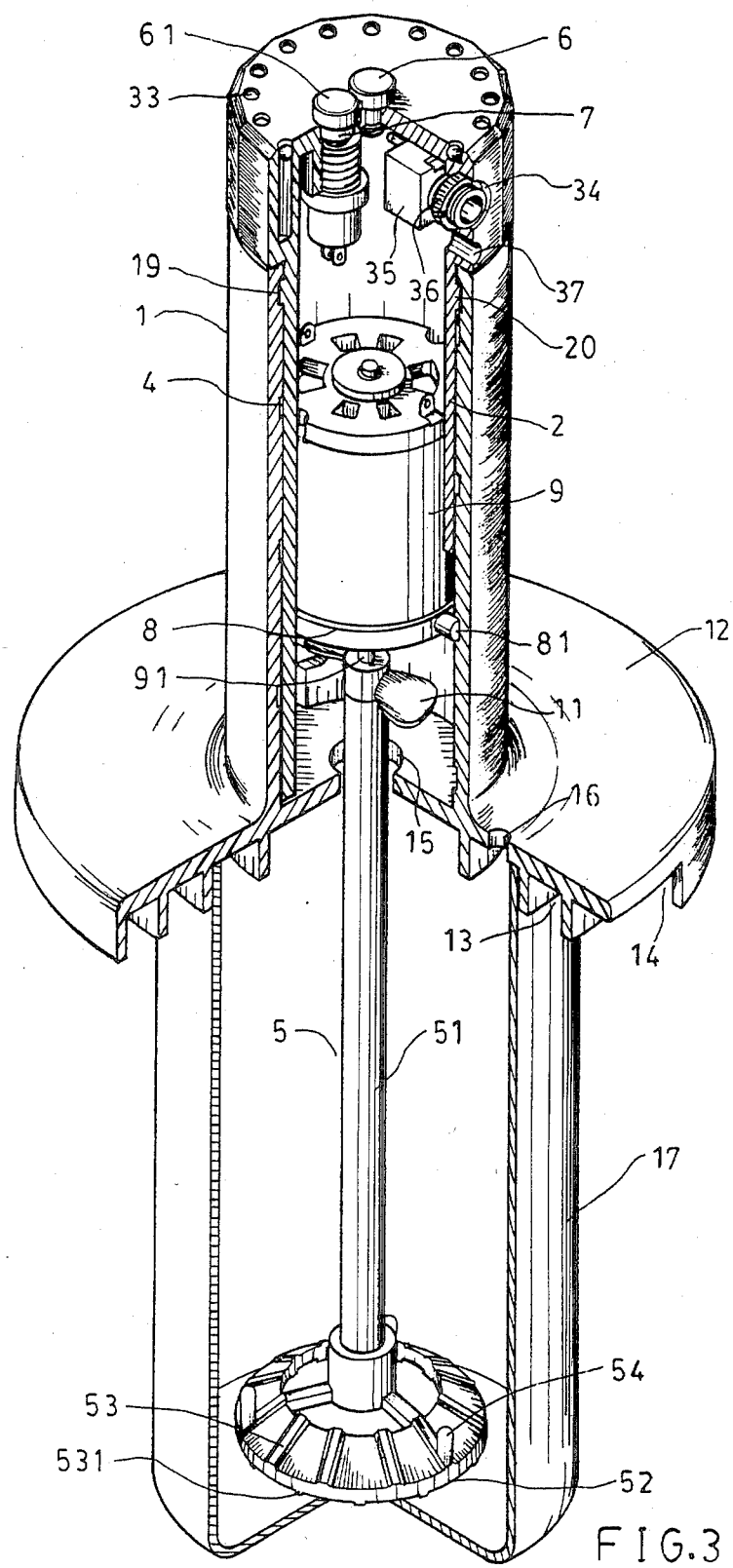
FIG. 3 is a fragmental of a sectional view of an embodiment of the present invention.

FIG. 3 is a fragmental of a sectional view of one embodiment of the present invention, in which the container 17 is closely mounted in one of the concentric round grooves 13. The agitator 5 can be set at a suitable position level in accordance with the amount of the egg liquid to be agitated. For example, if there is only one egg in the container 17, the agitator 5 should be set near the bottom of the container 5. Upon the power cord being plugged into the socket 35, press down the switch 7 to start the motor and the agitator 5. If only a short period of time (several seconds) is required to agitate, just push the switch 7 with a finger. In case of requiring longer time of agitation, set the pressing cap 61 of the retainer 6 on to the switch 7 for continuous operation for a period of time required. To stop the agitation, just remove the pressing cap 61 away from the switch 7, and the switch will automatically be turned off to stop the motor 9.

Figure 4:
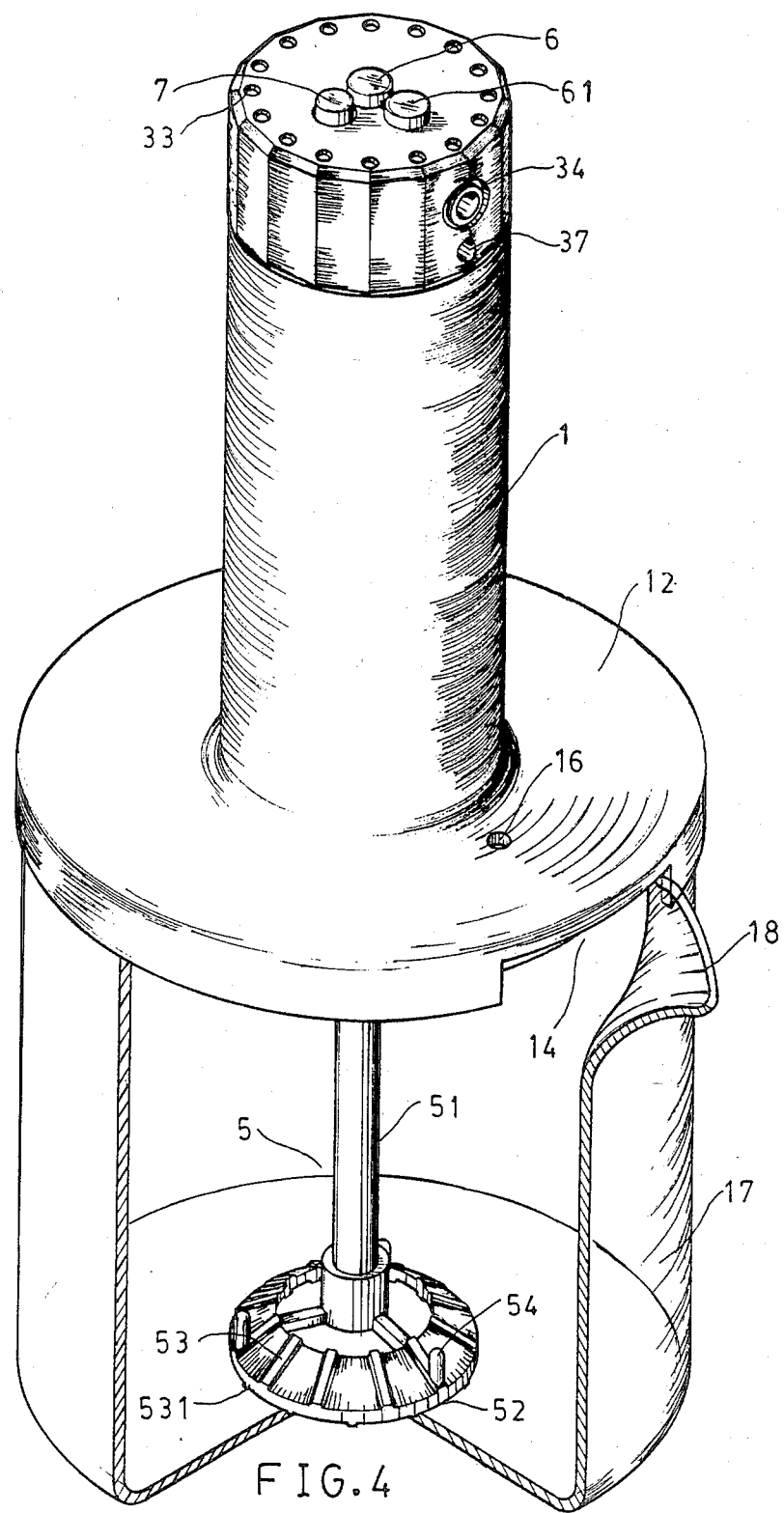
FIG. 4 is a fragmental of a sectional view of another embodiment according to the present invention.

FIG. 4 illustrates another embodiment of the present invention, in which the bottom of the base 12 is mounted on a large container 17 that has a projected outlet 18 engaged with the cut portion 14 of the base 12. If the container 17 is loaded with a large quantity of egg liquid, or the container has a lower height, turn the rotary cap 3 to have the motor base 8 moved upwards along the coil groove 4, and also to cause the agitator 5 to move upwards until a suitable level in the container is reached for better agitation. Upon the studs 81 of the motor base 8 moving upwards and being engaged with the notches 21, the motor base 8 is lifted to its highest level. On the contrary, if there is only a small amount of egg liquid or the container is short, the motor base 8 may be lowered until the studs 81 is engaged into notches 22, i.e., the lowest level of the motor base 8; in other words, the position of the motor base 8 can be adjusted between the two sets of notches 21 and 22. To operate the whisk, just hold the handle 1 with one handle and press the switch 7 with a thumb; that way of operation is conforming to the principle of human engineering. The container can be replaced with any suitable size and desired diameter. After the power cord is removed from the socket, the agitator 5 can be put under a water faucet to wash directly.

Briefly, the present invention not only can use different sized containers, but also can be operated automatically without being held with hand or attended by a person. Further, the position of the agitator can be adjusted, if necessary, therefore, the present invention is deemed a desirable apparatus in assisting the housewives in cooking.

What is claimed is:

1. An automatic egg-beater comprising:
    a cylindrical handle which includes helical groove formations on the inner surface thereof, a round base at the bottom terminus portion having several concentric round groove formations adapted to engage with containers of different size and diameters; and on the wall of said round base, a cut portion is furnished for fitting a tapering outlet of a respective container used with the egg-beater, and said round base being furnished with a small hole for ventilation of and adding flavorings to said egg-beater;
    an inner cylinder adapted to be installed on the inner surface of said cylindrical handle and having vertical slot formations on both sides thereof for a respective motor base to move up and down along said slot formations of said inner cylinder;
    a rotary cap adapted to be mounted provided atop of said inner cylinder, said rotary cap having two round holes on its top respectively for a retainer and a switch, having a polygonal outer surface to allow a positive grip by a user and to preclude rolling about on a flat surface, and having a socket hole on one side for mounting an associated socket that is fixed in place with a retaining collar; said socket being used to connect with a power supply;
    a motor mounted in said inner cylinder, said motor having a motor spindle which is adapted to be fitted in a respective spindle hole formation;
    a motor base fixed under the bottom terminus of said motor with screws, said motor base having two studs extended out from the circumference for moving within said slot formations of said inner cylinder respectively, and said motor base having two ventilation slot formations in the center portion;

a fan blade assembly with a spindle hole in which can be fitted said motor spindle, and with a round stub terminus;

a center rod having a first end sleeved on said round stub terminus, and said center rod having a second end for a respective agitator disc;

a convex-shaped agitator disc operatively connectable at said second end of said center rod, said agitator disc having a plurality of ribs at a first, upper surface and a plurality of projecting agitating studs at a second, lower surface;

a retainer mounted in one round hole of said rotary cap; said retainer including a pressing cap, for actuation of a respective switch; and a switch respectively mounted in the other round hole of said rotating cap, said switch being adapted to be turned off and on for correspondingly energizing said motor.

2. The egg-beater according to claim 1, wherein said retainer is rotatably mounted in the one round hole with its pressing cap, and said pressing cap is positioned atop of said switch for effecting the setting of said switch in a normal, "ON" condition so as to have said motor run continuously for actuation of said agitator.

3. The egg-beater according to claim 1, wherein said two studs on said motor base can slidingly move up and down two helical groove formations on the inner wall of said cylindrical handle so as to cause movement of said agitator in up and down motions.

4. The egg-beater according to claim 1, wherein said motor base can slidingly move up and down along said vertical slot formations of said inner cylinder upon turning of said rotary cap.

5. The egg-beater as claimed in claim 1, wherein in the wall of said inner cylinder two sets of symmetrical notch formations are disposed which are adapted to respectively receive and position said two studs of said motor base to preclude sliding up and down when said motor base has been set at a desired level.

* * * * *